(12) United States Patent
Randall

(10) Patent No.: US 6,601,642 B1
(45) Date of Patent: Aug. 5, 2003

(54) DEVICE FOR THAWING FOOD

(75) Inventor: Russell E. Randall, Tarpon Springs, FL (US)

(73) Assignee: Future Flows, Inc., Clearwater, FL (US)

( * ) Notice: Subject to any disclaimer, the term of this patent is extended or adjusted under 35 U.S.C. 154(b) by 0 days.

(21) Appl. No.: 10/064,725

(22) Filed: Aug. 9, 2002

(51) Int. Cl.[7] .................................................. F28F 5/00
(52) U.S. Cl. ............................ 165/86; 165/185; 99/483
(58) Field of Search ...................... 165/86, 185; 99/377, 99/379, 483

(56) References Cited

U.S. PATENT DOCUMENTS

| | | | | |
|---|---|---|---|---|
| 599,153 A | * | 2/1898 | Taylor | 165/86 |
| 1,031,085 A | * | 7/1912 | Nuubson | 99/379 |
| 1,758,121 A | * | 5/1930 | Lines | 99/379 |
| 2,765,727 A | * | 10/1956 | Lipsich et al. | 99/331 |
| 5,349,899 A | * | 9/1994 | Tominaga et al. | 99/646 R |

* cited by examiner

*Primary Examiner*—Allen Flanigan
(74) *Attorney, Agent, or Firm*—Ronald E. Smith; Smith & Hopen, P.A.

(57) ABSTRACT

A device for thawing frozen food requires no electrical energy consumption. A frozen food item is supported by a metallic bottom part and a metallic top part overlies the food item so that the food item is held in sandwiched relation between the top and bottom parts. The distance between the top part and the bottom part is vertically adjustable to accommodate frozen food items of differing sizes. A plurality of heat transfer fins are integrally formed in the top part and deliver heat from the ambient environment into the food item. A second embodiment includes fins on the bottom part as well. Moisture created by the thawing drains away from the food item under the influence of gravity.

16 Claims, 2 Drawing Sheets

DEVICE FOR THAWING FOOD

BACKGROUND OF INVENTION

1. Field of the Invention

This invention relates, generally, to food preparation. More particularly, it relates to an environmentally-friendly food-thawing device.

2. Description of the Prior Art

Most food-thawing devices of the prior art are energy-consuming devices. They typically draw electrical current through resistive heating elements to generate the heat required for thawing. Microwave ovens may also be used; the molecules of moisture in the frozen item oscillate at the same frequency as the microwaves and the resulting friction produces heat.

It is of course well-known that no energy is consumed if a frozen item is simply exposed to room temperature for an extended period of time. However, depending upon the size, mass, temperature, and heat transfer characteristics of the food article, as well as the temperature, humidity and other parameters of the ambient atmosphere, the amount of time required to thaw may be unacceptably long.

What is needed, then, is an environmentally-friendly device that performs the function of food thawing in a relatively short amount of time and in the absence of electrical energy consumption.

The needed device should have a simple yet elegant construction so that is it economical to manufacture and easy to use.

However, in view of the prior art considered as a whole at the time the present invention was made, it was not obvious to those of ordinary skill in the pertinent art how the identified needs could be fulfilled.

SUMMARY OF INVENTION

The long-standing but heretofore unfulfilled need for a food thawing device that consumes no electrical energy is now met by a new, useful, and nonobvious invention.

In a first embodiment, the novel structure includes a bottom part and a top part of predetermined geometrical configuration. The bottom part has a flat support wall adapted to support a food item. The top part has a flat top wall adapted to abuttingly engage and overlie a food item supported by the support wall. An adjustable spacer means for adjusting a vertical spacing between the bottom and top parts is provided so that the device is adapted to accommodate food items of differing sizes. The adjustable spacer means includes a pair of upstanding posts that slidingly engage respective proximal ends of the top part and the bottom part. The pair of posts includes a first post and a second post.

First and second bores are formed in a proximal end of the bottom part in transversely spaced apart relation to one another and first and second bores are formed in a proximal end of the top part in transversely spaced apart relation to one another. The first bores are in vertical alignment with one another and the second bores are in vertical alignment with one another. The first bores slideably receive the first post and the second bores slideably receive the second post.

In a first embodiment, a plurality of heat transfer fin members is formed integrally with the top part of the novel food thawing device. Each fin of the plurality of heat transfer fins has a broad base and a narrow top and extends the entire longitudinal extent of the top part. The fins could also have an untapered construction.

The top part and the bottom part are of metallic construction, preferably aluminum. Heat from an ambient environment is transferred through the plurality of heat transfer fin members to the food item held in sandwiched relation between the bottom and top parts. Accordingly, the food item thaws rapidly in the absence of electrical energy consumption.

The bottom part has a flat bottom wall of less extent than the flat support wall of the bottom part. A beveled flat wall interconnects respective distal ends of the bottom part support wall and bottom wall. The device is adapted to be supported by a support surface. The flat beveled wall is adapted to squarely overlie the support surface when the proximal end of the bottom part is in predetermined spaced relation to respective bottom ends of the first and second posts so that the flat support wall of the bottom part is sloped downwardly from a proximal end thereof to a distal free end thereof.

A second embodiment also includes a top part and a bottom part of predetermined geometrical configuration but heat transfer fins are formed on both of said top and bottom parts. As in the first embodiment, the bottom part has a flat support wall adapted to support a food item and the top part has a flat top wall adapted to abuttingly engage and overlie a food item supported by the support wall. A plurality of heat transfer fin members is formed integrally with the top wall in upstanding relation thereto and a plurality of heat transfer fin members is formed integrally with the support wall of the bottom part in depending relation thereto. Adjustable spacer means are provided to adjust a vertical spacing between the support wall of the bottom part and the top wall of the top part so that the device is adapted to accommodate food items of differing sizes.

Heat from an ambient environment is transferred through the plurality of heat transfer fin members to the food item held in sandwiched relation between the support and top walls so that a food item disposed therebetween thaws rapidly in the absence of electrical energy consumption. The number of fins is doubled in this second embodiment relative to the first embodiment so the time required to defrost an item is shortened.

The second embodiment also includes a stand that is detachably secured to the distal end of the bottom part. The stand has a low profile so that the support wall is sloped downwardly as in the first embodiment. In both the first and second embodiments, the preferred slope of the support wall is about thirty degrees.

An important object of this invention is to provide a food-thawing device that operates without electrical energy consumption.

A closely related object is to provide a food-thawing device that thaws food quickly.

Another important object is to provide an easy-to-use device that is readily affordable by consumers.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
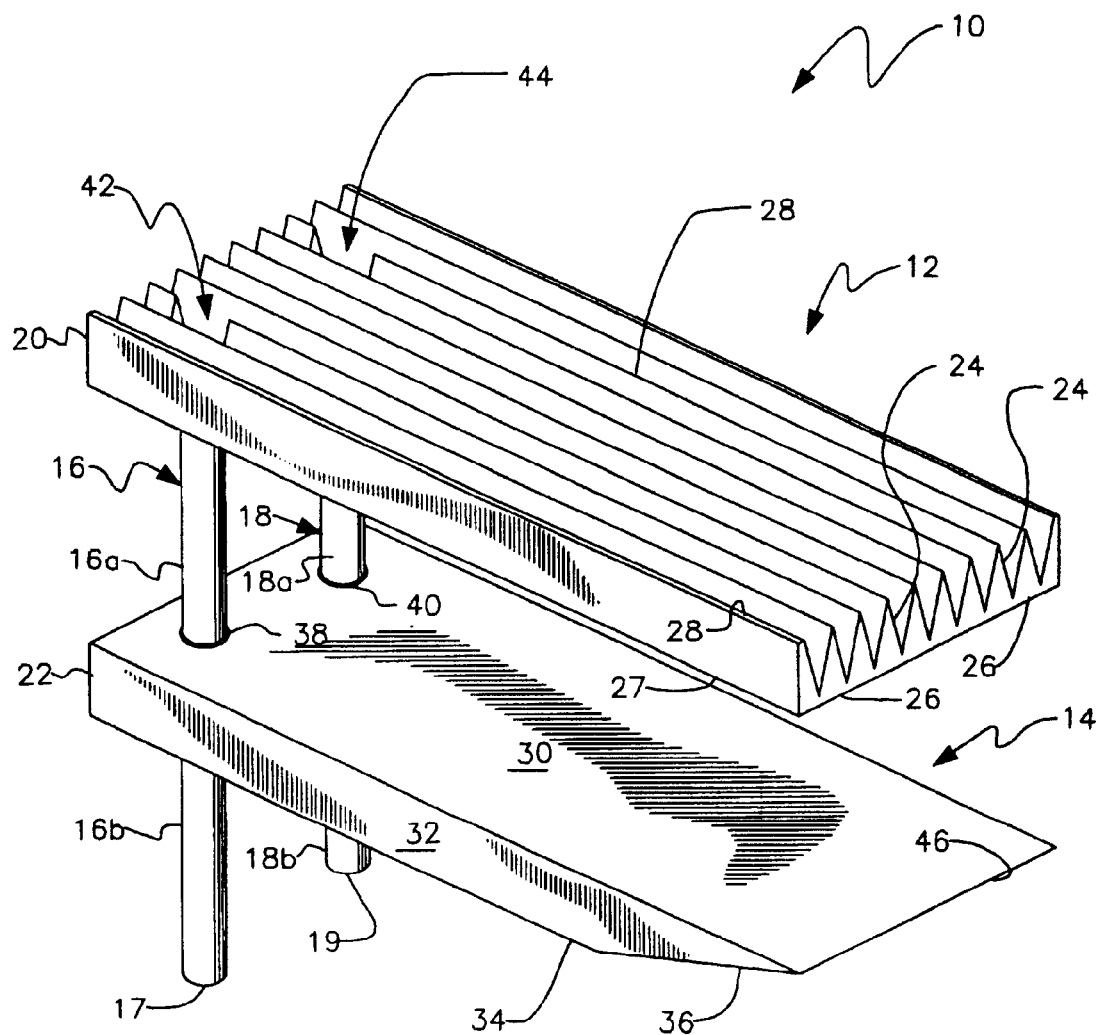
FIG. 1 is a perspective view of a first illustrative embodiment of the novel food-thawing device.

Referring to the perspective view of FIG. 1, it will there be seen that the reference numeral 10 denotes an illustrative embodiment of the novel food-thawing device as a whole.

Device 10 includes top part 12 and bottom part 14. First post 16 and second post 18 interconnect said top and bottom parts at the respective proximal ends 20, 22 thereof.

Top part 12 is a heat transfer device. It is preferably formed of aluminum and includes a plurality of heat transfer fins, collectively denoted 24. Each fin has a longitudinal extent equal to the longitudinal extent of top part 12. Each fin 24 has a wide base 26 that tapers down to a narrow top 28. Each fin 24 has a solid construction to enhance its heat transfer capability.

Bottom part 14 is also preferably made of aluminum, but in this first embodiment it is not finned as is top part 12. Bottom part 14 may be of solid or hollow construction, but a solid construction is preferred so that said bottom part may act as a heat sink.

Bottom part 14 has a flat support wall 30 that supports a frozen food item, not shown. The length and breadth of said support wall 30 is substantially equal to the length and breadth of top part 12. Side walls 32 of bottom part 14 have a height substantially similar to the height of fins 24, i.e., the thickness of bottom part 14 is substantially equal to the thickness of top part 12.

Bottom wall 34 of bottom part 14 has the same breadth as support wall 30 thereof, but it has less longitudinal extent as depicted. A flat beveled wall 36 interconnects the respective distal free ends of support wall 30 and bottom wall 34. As will be better understood as this description proceeds, flat beveled wall 36 overlies a support surface, not shown, when device 10 is in use.

First and second post members 16, 18 interconnect top part 12 and bottom part 14 to one another at their respective proximal ends 20, 22 as aforesaid. Post members 16, 18 are transversely spaced apart from one another and are equidistantly spaced on opposite sides of a longitudinal axis of symmetry of device 10. When device 10 is in use, bottom ends 17, 19 of posts 16, 18 are squarely positioned atop a flat support surface such as a table top, not shown. Beveled wall 36 also is positioned squarely atop such support surface. Thus, beveled wall 36 and post members 16, 18 provide a stable three-point triangular support means for device 10.

Proximal end 22 of bottom part 14 is bored as at 38, 40 to slidingly receive post members 16, 18, respectively. Proximal end 20 of top part 12 is similarly bored as at 42, 44 for the same reason.

Each post member 16 and 18 has an annular shoulder, not shown, formed therein so that upper ends 16a, 18a thereof have a reduced diameter relative to lower ends 16b, 18b.

To assemble thawer 10, reduced diameter upper end 16a of post 16 is inserted through bore 38 formed in bottom part 14 from the bottom side of said bottom part until the unillustrated shoulder abuts bore 38. Reduced upper diameter end 16a is then inserted through bore 42 formed in top part 12.

Substantially simultaneously, reduced diameter upper end 18a of post 18 is inserted through bore 40 formed in bottom part 14 from the bottom side of said bottom part until the unillustrated shoulder abuts said bore 40. Reduced upper diameter end 18a is then inserted through bore 44 formed in top part 12.

The unillustrated shoulder is the only shoulder formed in posts 16, 18. Thus, proximal end 22 of bottom part 14 is positioned a fixed distance above a support surface such as a table when thawer 10 is assembled.

Proximal end 20 of top part 12 is slideable along the extent of the reduced diameter part 16a, 18a of posts 16, 18, respectively, there being a frictional engagement between said reduced diameter parts 16a, 18a and bores 38, 42 and 40, 44, respectively, that enables such sliding motion to occur when a moderate amount of force is applied to displace said top part 12 along the length of said reduced diameter parts. The friction is sufficient to maintain the proximal ends of the top and bottom parts in a preselected spaced vertical relation to one another when no force is applied to change said vertical spacing. In this way, the vertical distance between the proximal ends 20, 22 of top part 12 and bottom part 14 is infinitely adjustable from an uppermost position where said top and bottom parts are vertically spaced from one another by a maximum distance to a lowermost position where top part 12 abuttingly engages and overlies bottom part 14.

Top part 12 has a flat top wall 27 formed collectively by bases 26 of fins 24. Said flat top wall 27 is adapted to abuttingly engage and overlie a frozen food item supported by flat support wall 30 of bottom part 14. Accordingly, a frozen food item is held in sandwiched relation to said top and bottom parts 12 and 14 when device 10 is in use.

To use the first embodiment of device 10, posts 16 and 18 are slideably introduced through bores 38, 42 and 40, 44, respectively, as described above. The unillustrated annular shoulders in said posts 16, 18 thus abut bores 38, 40, respectively as aforesaid and thus position proximal end 22 of bottom part 14 a predetermined distance above a support surface. This imparts a downward slope from said proximal end 22 to the distal free end 46 of bottom part 14. It also positions flat beveled wall 36 into squarely overlying relation to said support surface.

Top part 12 is then raised to its highest, uppermost position. The frozen food item, whether meat, vegetable, bread, fruit, or the like, is then placed atop support wall 30 of bottom part 14 and top part 12 is lowered with respect to posts 16 and 18 until top wall 27 thereof abuttingly engages the food item in overlying relation thereto. In a preferred method of use, top part 12 is pressed down firmly onto the food item to enhance the heat transfer process.

Fins 24 quickly transfer heat in the ambient environment into the food item. A sizzling sound is heard as the frost quickly dissipates and the item is brought quickly to room temperature. The downward slant of support wall 30, caused by the elevation of proximal end 22 of bottom part 14 relative to its distal free end as aforesaid, allows the moisture generated by the rapid thawing to flow downwardly to the support surface so that no moisture accumulates atop support wall 30. Such accumulation could insulate the food item to some extent and slow the thawing process.

Leading edge 46 of bottom part 14 is advantageously placed in open communication with a sink or other basin adapted to receive liquid.

Food thawer 10 provides a rapid thaw of any food item and does so in the absence of electrical or other energy consumption. Posts 16, 18 may be manufactured in any length to accommodate large food items such as frozen turkeys and the like. Similarly, top and bottom parts 12 and 14 may also be manufactured in any size for the same reason.

There is no requirement that top and bottom parts 12 and 14 be rectangular in configuration. They may be square, round, triangular, elliptical, or any other predetermined geometric configuration.

Nor must food thawer 10 be made of aluminum. Other metals will work and empirical studies may show that another element or alloy is more optimal than aluminum.

Moreover, the unillustrated annular shoulders formed in posts 16, 18 are not critical to this invention. Due to the friction fit between posts 16, 18 and their respective bores 38, 40, proximal end 22 of bottom part 14 may still be elevated above a support surface by a preselected extent even if no annular shoulders are provided. The unillustrated shoulders ensure that the slope of bottom wall 30 will be about thirty degrees (30°), but without said shoulders a user can still adjust said bottom wall to approximately said slope with no substantial difficulty.

Figure 2:
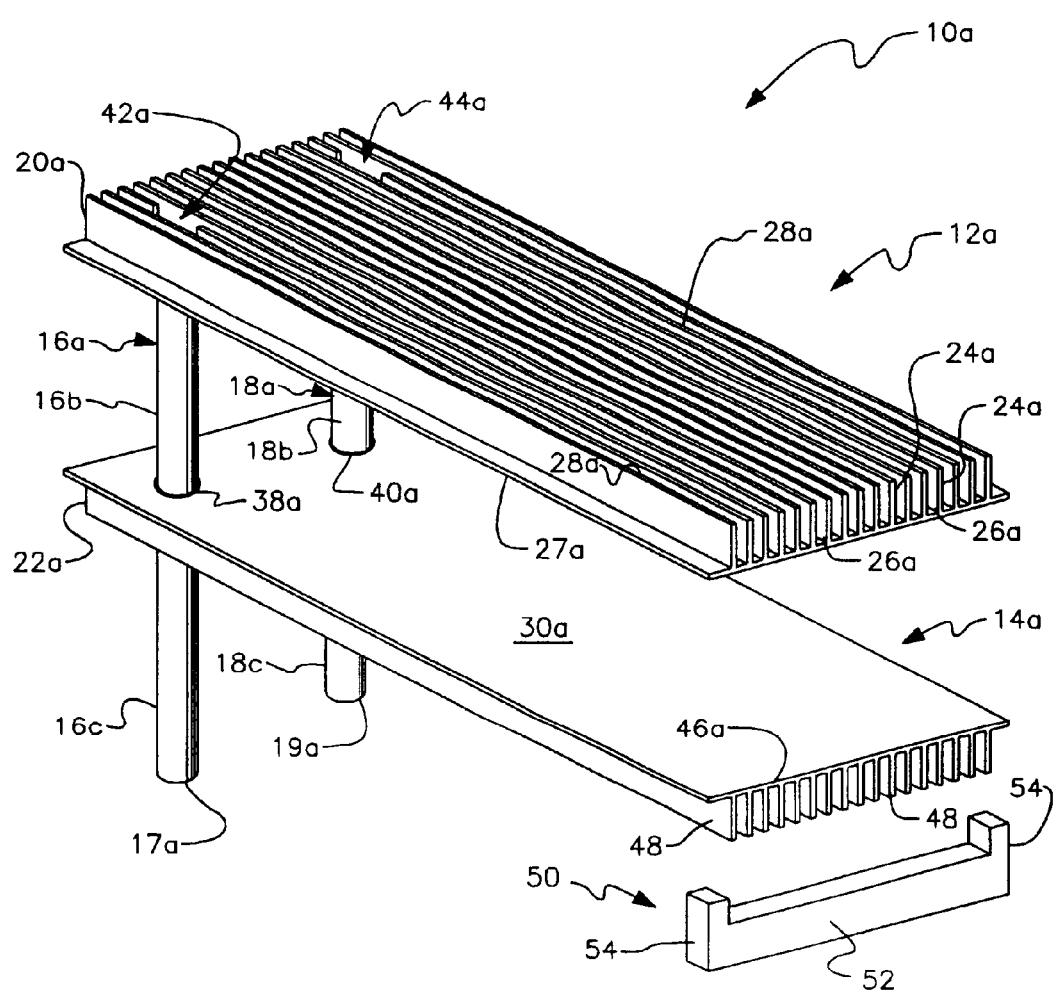
FIG. 2 is a perspective view of a second illustrative embodiment of the novel food-thawing device.

Referring now to the perspective view of FIG. 2, it will there be seen that the reference numeral 10a denotes a second illustrative embodiment of the novel food-thawing device as a whole.

Device 10a includes top part 12a and bottom part 14a. First post 16a and second post 18a interconnect said top and bottom parts at the respective proximal ends 20a, 22a thereof.

Top part 12a is a heat transfer device. It is preferably formed of aluminum and includes a plurality of heat transfer fins, collectively denoted 24a, that project upwardly in upstanding relation to flat top wall 27a. Each fin has a longitudinal extent equal to the longitudinal extent of top part 12a. Each fin 24a has a uniform width, includes a base 26a and a top 28a, and has a solid construction to enhance its heat transfer capability.

Bottom part 14a is also a heat transfer device and is also preferably made of aluminum. It includes flat support wall 30a having a plurality of longitudinally extending fins, collectively denoted 48, that depend therefrom. Support wall 30a supports a frozen food item, not shown. The length and breadth of flat support wall 30a is substantially equal to the length and breadth of flat top wall 27a.

First and second post members 16a, 18a interconnect top part 12a and bottom part 14a at their respective proximal ends 20a, 22a as aforesaid. Post members 16a, 18a are transversely spaced apart from one another and are equidistantly spaced on opposite sides of a longitudinal axis of symmetry of device 10a.

When device 10a is in use, bottom ends 17a, 19a of posts 16a, 18a are squarely positioned atop a flat support surface such as a table top, not depicted.

Proximal end 22a of bottom part 14a is bored as at 38a, 40a to slidingly receive post members 16a, 18a, respectively. Proximal end 20a of top part 12a is similarly bored as at 42a, 44a for the same reason.

Each post member 16a and 18a has an annular shoulder, not shown, formed therein so that upper ends 16b, 18b have a reduced diameter relative to lower ends 16c, 18c.

To assemble thawer 10, reduced diameter upper end 16b of post 16a is inserted through bore 38a formed in bottom part 14a from the bottom side of said bottom part until the unillustrated shoulder abuts bore 38a. Reduced upper diameter end 16b is then inserted through bore 42a formed in top part 12a.

Substantially simultaneously, reduced diameter upper end 18b of post 18a is inserted through bore 40a formed in bottom part 14a from the bottom side of said bottom part until the unillustrated shoulder abuts bore 40a. Reduced upper diameter end 18b is then inserted through bore 44a formed in top part 12a.

The unillustrated shoulder is the only shoulder formed in posts 16a, 18a. Thus, proximal end 22a of bottom part 14a is positioned a fixed distance above a support surface such as a table when thawer 10a is assembled.

Proximal end 20a of top part 12a is slideable along the extent of the reduced diameter part 16a, 18a of said posts, their being a frictional engagement between said reduced diameter parts of said posts 16a, 18a and bores 38a, 40a that enables such sliding motion to occur when a moderate amount of force is applied to displace said top part 12a along the length of said reduced diameter parts. The friction is sufficient to maintain the proximal ends of the top and bottom parts in a preselected spaced vertical relation to one another when no force is applied to change said vertical spacing. In this way, the vertical distance between the proximal ends of top part 12a and bottom part 14a is infinitely adjustable from an uppermost position where said top and bottom parts are vertically spaced from one another by a maximum distance to a lowermost position where top wall 27a abuttingly engages and overlies support wall 30a.

Top wall 27a of top part 12a is adapted to abuttingly engage and overlie a frozen food item supported by flat support wall 30a of bottom part 14a. Accordingly, a frozen food item is held in sandwiched relation to said top and bottom parts 12a and 14a when device 10a is in use.

Support member 50 is adapted to releasably engage the distal end of bottom part 14a. Interconnecting part 52 has a transverse extent substantially equal to the collective transverse extent of depending fins 48. Grips 54, 54 are interconnected to one another and are formed integrally with interconnecting part 52 at opposite ends thereof. Although device 10a may be used without support member 50, said support member is preferably engaged by a detachable press fit to the opposite ends of depending fins 48 when device 10a is in use. The height of interconnecting member 52 is nominal, being only a quarter inch or so. Accordingly, support wall 30a slopes downwardly to ensure drainage of moisture therefrom.

To use food thawer 10a, top plate 12a is raised to its highest, uppermost position. The frozen food item, whether meat, vegetable, bread, fruit, or the like, is then placed atop flat support wall 30a of bottom part 14a and top part 12a is lowered with respect to posts 15a and 16a until bottom wall 27a of top part 12a thereof abuttingly engages the food item in overlying relation thereto. In a preferred method of use, top part 12a is pressed down firmly onto the food item to enhance the heat transfer process.

Fins 24a and 48a quickly transfer heat in the ambient environment into the food item. A sizzling sound is heard as the frost quickly dissipates and the item is brought quickly to room temperature.

Leading edge 46a of bottom part 14a is advantageously placed in open communication with a sink or other basin adapted to receive liquid.

As in the first embodiment, food thawer 10a provides a rapid thaw of any food item and does so in the absence of electrical or other energy consumption. Posts 16a, 18a may be manufactured in any length to accommodate large food items such as frozen turkeys and the like. Similarly, top and bottom parts 12a and 14a may also be manufactured in any size for the same reason.

There is no requirement that top and bottom parts 12a and 14a be rectangular in configuration. They may be square, round, triangular, elliptical, or any other predetermined geometric configuration.

Nor must food thawer 10a be made of aluminum. Other metals will work and empirical studies may show that another element or alloy is more optimal than aluminum.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,
What is claimed is:

1. A device for thawing food, comprising:
   a bottom part of predetermined geometrical configuration, said bottom part having a flat support wall adapted to support a food item;
   a top part of predetermined geometrical configuration, said top part having a flat top wall adapted to abuttingly engage and overlie a food item supported by said support wall;
   a plurality of heat transfer fin members formed integrally with said top part;
   adjustable spacer means for adjusting a vertical spacing between said bottom and top parts so that said device is adapted to accommodate food items of differing sizes;
   said adjustable spacer means including a pair of upstanding posts that slidingly engage respective proximal ends of said top part and said bottom part, said pair of posts including a first post and a second post;
   whereby heat from an ambient environment is transferred through said plurality of heat transfer fin members to said food item held in sandwiched relation between said bottom and top parts;
   whereby said food item is thawed in the absence of electrical energy consumption.

2. The device of claim 1, wherein said bottom part has a flat bottom wall of less extent than said flat support wall, and further comprising a beveled flat wall that interconnects respective distal ends of said support wall and bottom wall.

3. The device of claim 2, wherein said device is adapted to be supported by a support surface, and wherein said flat beveled wall is adapted to squarely overlie said support surface.

4. The device of claim 2, wherein said flat beveled wall is adapted to squarely overlie said support surface when said proximal end of said bottom plate is in predetermined spaced relation to respective bottom ends of said first and second posts so that said flat support wall is sloped downwardly from a proximal end thereof to a distal free end thereof.

5. The device of claim 4, further comprising first and second bores formed in a proximal end of said bottom part in transversely spaced apart relation to one another and first and second bores formed in a proximal end of said top part in transversely spaced apart relation to one another.

6. The device of claim 5, wherein said first bores are in vertical alignment with one another, wherein said second bores are in vertical alignment with one another, wherein said first bores slideably receive said first post and wherein said second bores slideably receive said second post.

7. The device of claim 1, wherein each fin of said plurality of heat transfer fins has a broad base and a narrow top and extends the entire longitudinal extent of said top part.

8. The device of claim 1, wherein said top part and said bottom part are of metallic construction.

9. The device of claim 1, wherein said top part and said bottom part are made of aluminum.

10. A device for thawing food, comprising:
    bottom part of predetermined geometrical configuration, said bottom part having a flat support wall adapted to support a food item;
    a top part of predetermined geometrical configuration, said top part having a flat top wall adapted to abuttingly engage and overlie a food item supported by said bottom wall;
    a plurality of heat transfer fin members formed integrally with said support wall in depending relation thereto;
    a plurality of heat transfer fin members formed integrally with said top wall in upstanding relation thereto; and
    adjustable spacer means for adjusting a vertical spacing between said support wall and said top wall so that said device is adapted to accommodate food items of differing sizes;
    said adjustable spacer means including a pair of upstanding posts that slidingly engage respective proximal ends of said top part and said bottom part, said pair of posts including a first post and a second post;
    whereby heat from an ambient environment is transferred through said plurality of heat transfer fin members to said food item held in sandwiched relation between said support and top walls;
    whereby said food item thaws rapidly in the absence of electrical energy consumption.

11. The device of claim 10, further comprising first and second bores formed in a proximal end of said bottom part in transversely spaced apart relation to one another and first and second bores formed in a proximal end of said top part in transversely spaced apart relation to one another.

12. The device of claim 11, wherein said first bores are in vertical alignment with one another, wherein said second bores are in vertical alignment with one another, wherein said first bores slideably receive said first post and wherein said second bores slideably receive said second post.

13. The device of claim 12, further comprising a first annular shoulder formed in said first post and a second annular shoulder formed in said second post, said first annular shoulder reducing a diameter of an upper end of said first post so that it has a diameter less than a diameter of a lower end of said first post and said second shoulder reducing a diameter of an upper end of said second post so that it has a diameter less than a diameter of a lower end of said second post, said first and second bores formed in said proximal end of said bottom part having a common diameter sufficient to receive said respective upper ends of said first and second posts but insufficient to receive said respective lower ends of said first and second posts so that said shoulders space said proximal end of said bottom part from a support surface by a distance equal to a length of said respective posts between respective lowermost ends of said posts and said first and second annular shoulders so that said flat support wall of said bottom part is sloped downwardly from said proximal end thereof to a distal free end thereof when said distal free end is supported by said support surface.

14. The device of claim 10, further comprising:

a support member that releasably engages a distal end of said bottom part;

said support member including an interconnecting part having a transverse extent substantially equal to the collective transverse extent of said depending fins;

a pair of grips interconnected to one another by said interconnecting part and being formed integrally with said interconnecting part at opposite ends thereof;

said support member being engaged by a detachable press fit to opposite ends of said depending fins;

whereby said support wall slopes downwardly to ensure drainage of moisture therefrom.

15. The device of claim 10, wherein said top part and said bottom part are of metallic construction.

16. The device of claim 10, wherein said top part and said bottom part are made of aluminum.

* * * * *